United States Patent [19]

Cuevas

[11] Patent Number: 5,590,905
[45] Date of Patent: Jan. 7, 1997

[54] AIR BAG INFLATOR

[75] Inventor: Jess A. Cuevas, Scottsdale, Ariz.

[73] Assignee: TRW Inc., Lyndhurst, Ohio

[21] Appl. No.: 349,944

[22] Filed: Dec. 6, 1994

[51] Int. Cl.$^6$ ................................................ B60R 21/16
[52] U.S. Cl. .................... 280/737; 280/736; 280/740; 280/741
[58] Field of Search .................... 280/737, 741, 280/736, 740, 728.1; 222/3, 5

[56] References Cited

U.S. PATENT DOCUMENTS

| | | |
|---|---|---|
| 3,797,853 | 3/1974 | Grosch et al. ........................ 222/5 |
| 3,960,390 | 6/1976 | Goetz ................................. 280/737 |
| 3,966,226 | 6/1976 | Roth . | |
| 5,076,607 | 12/1991 | Woods et al. . | |
| 5,184,846 | 2/1993 | Goetz . | |
| 5,226,668 | 7/1993 | Delonge-Immik et al. . | |
| 5,242,194 | 9/1993 | Popek ................................. 280/737 |
| 5,301,978 | 4/1994 | Munzel et al. . | |
| 5,344,186 | 9/1994 | Bergerson et al. ................. 280/737 |
| 5,378,018 | 1/1995 | Ketterer ............................. 280/737 |

FOREIGN PATENT DOCUMENTS

WO91/11347  8/1991  WIPO .

Primary Examiner—Eric D. Culbreth
Attorney, Agent, or Firm—Tarolli, Sundheim, Covell, Tummino & Szabo

[57] ABSTRACT

An augment inflator (10) includes a rupture disk (140) covering an annular outlet opening (133) in a housing (40). A piston (150) is welded in the housing (40). Upon actuation of the inflator (10), gas generating material (220) ignites in a combustion chamber (158) in the piston (150). The pressure increases in the combustion chamber (158) until a stress riser (190) on the piston (150) ruptures. A severed portion of the piston (150) moves and a circular cutting edge (182) on the piston shears a circular opening in the rupture disk (140).

11 Claims, 5 Drawing Sheets

5,590,905

AIR BAG INFLATOR

BCAKGROUND OF THE INVENTION

1. Technical Field

The present invention relates to a vehicle safety apparatus including an inflatable vehicle occupant restraint, and particularly relates to an air bag inflator for inflating an air bag to restrain a vehicle occupant.

2. Description of the Prior Art

It is known to protect a vehicle occupant by an air bag that is inflated in the event of sudden vehicle deceleration, such as occurs in a vehicle collision. The air bag restrains movement of the vehicle occupant during the collision. The air bag is inflated by inflation fluid from an inflator. The inflation fluid may be gas stored under pressure in a chamber, or may be gas generated by combustion of gas generating material in the inflator. Alternatively, the inflator may include an ignitable material which, when ignited, produces combustion products including heat and gas for heating and increasing the pressure of gas stored in a chamber.

Air bag inflators which include stored gas typically use a frangible closure member, such as a burst disk, for maintaining the pressure of the gas in the chamber. A burst disk is opened by manual engagement of a movable member with the burst disk or by increasing the pressure of the gas stored in the chamber beyond the rupture point of the burst disk.

SUMMARY OF THE INVENTION

The present invention is an apparatus for inflating an inflatable vehicle occupant restraint, including a housing defining a stored gas chamber containing gas for inflating the inflatable restraint. The housing includes walls which encircle an axis and which define a ring shaped portion of the stored gas chamber centered on the axis. The housing has an outlet opening through which gas can flow from the stored gas chamber. A shearable closure member on the housing closes the outlet opening. An igniter is connected with the housing radially inward of the ring shaped portion of the stored gas chamber. An annular piston encircles the igniter and is disposed radially inward of the walls which define the ring shaped portion of the stored gas chamber. The piston defines an ignitable material chamber which is located radially inward of the stored gas chamber and within which the igniter is disposed. An ignitable material is disposed in the ignitable material chamber for, upon actuation, producing combustion products including heat for heating and pressurizing the stored gas in the stored gas chamber. The piston has a circular cutting edge for shearing the closure member to enable flow of gas from the stored gas chamber through the outlet opening.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENTS OF THE INVENTION

Figure 1:
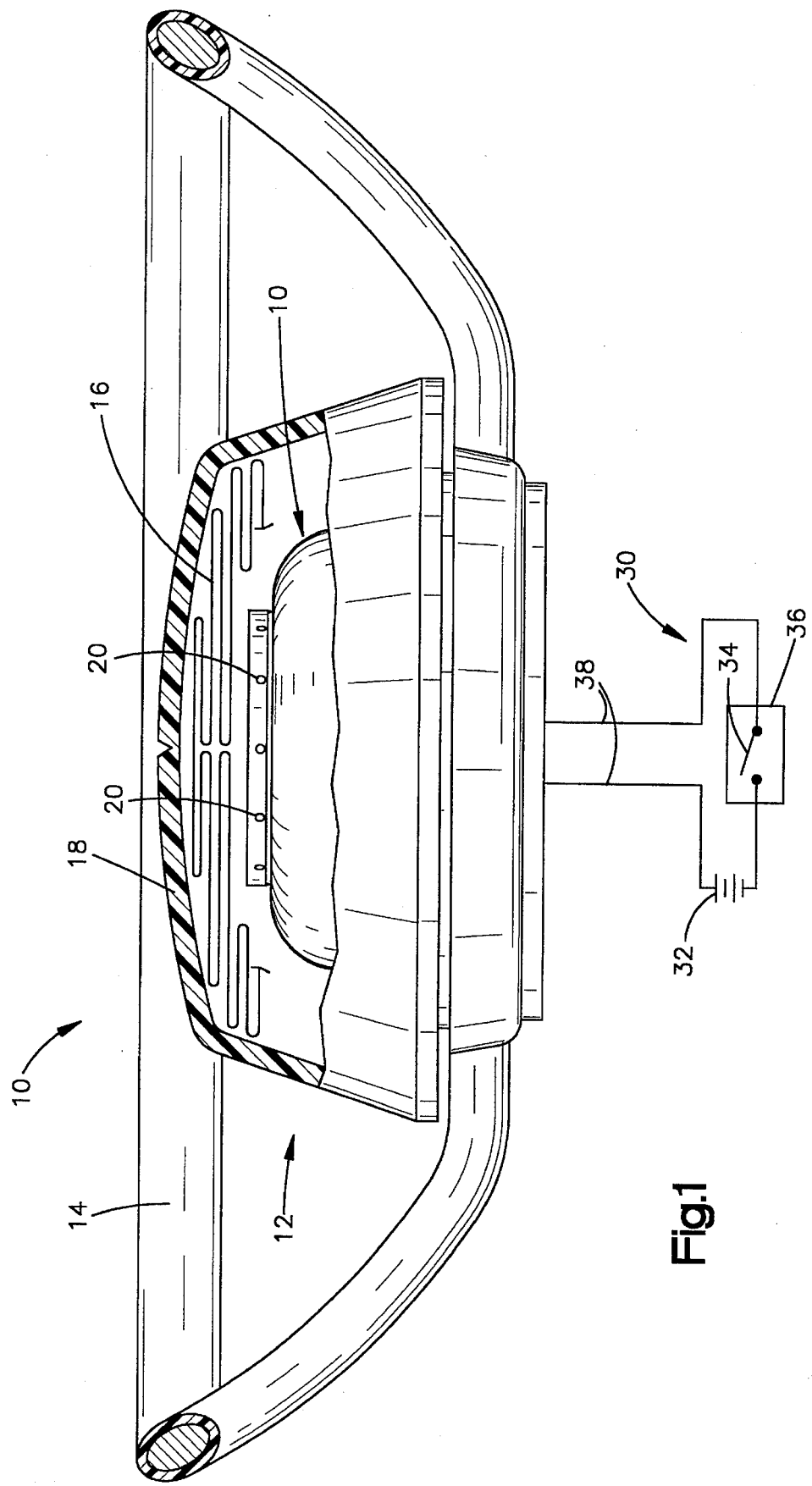
FIG. 1 is a schematic sectional view of a vehicle steering wheel assembly including an air bag module having an inflator constructed in accordance with the present invention.

The present invention relates to an apparatus for inflating an inflatable vehicle occupant restraint and, particularly, to an inflator for inflating an air bag to protect the driver of a vehicle. The present invention is applicable to various air bag inflator constructions. As representative of the present invention, FIG. 1 illustrates an inflator 10.

The inflator 10 is included in an air bag module 12 which is mounted at the center of a vehicle steering wheel 14. The air bag module 12 also includes an inflatable air bag 16 which is folded and stored with the inflator 14 inside a cover 18. A plurality of gas outlet openings 20 in the inflator 10 direct gas from the inflator 10 to the air bag 16 when the air bag is to be inflated.

As shown schematically in FIG. 1, a portion 30 of the vehicle electric circuitry includes a power source 32, such as the vehicle battery, and a normally open switch 34. The switch 34 is part of a deceleration sensor 36. The switch 34 closes upon the occurrence of a predetermined amount of vehicle deceleration indicative of a collision. When the switch 34 closes, electric current passes through lead wires 38 to actuate the inflator 10 in a manner as described below.

The inflator 10 (FIG. 2) includes a housing 40. The housing 40 includes a drawn stainless steel shell 50 which extends as a ring around a central axis 52 of the inflator 10. The shell 50 has a C-shaped radial section which is open at the radially inner side of the radial section. A radially extending generally planar upper wall 54 of the shell 50 has an outer major side surface 56. An annular edge portion 58 defines a circular upper opening 60 in the shell 50.

The shell 50 also includes a radially extending lower wall 62 having inner and outer major side surfaces 64 and 66. An annular mounting portion 68 of the lower wall 62 defines a circular lower opening 70 in the shell 50. The lower opening 70 is smaller in diameter than the upper opening 60.

Figure 2:
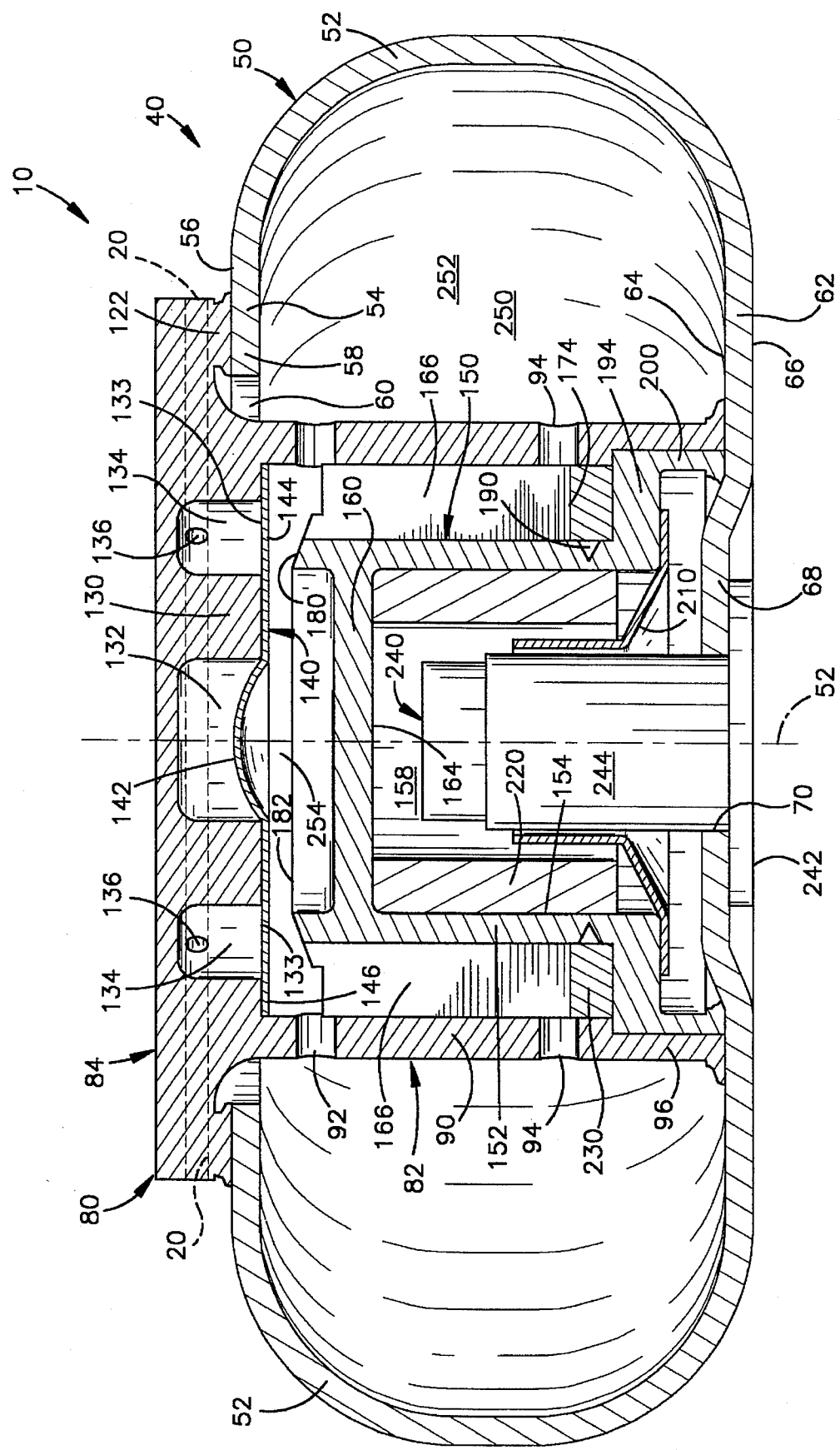
FIG. 2 is a sectional view of the inflator of FIG. 1, shown in an unactuated condition.
Figure 4:
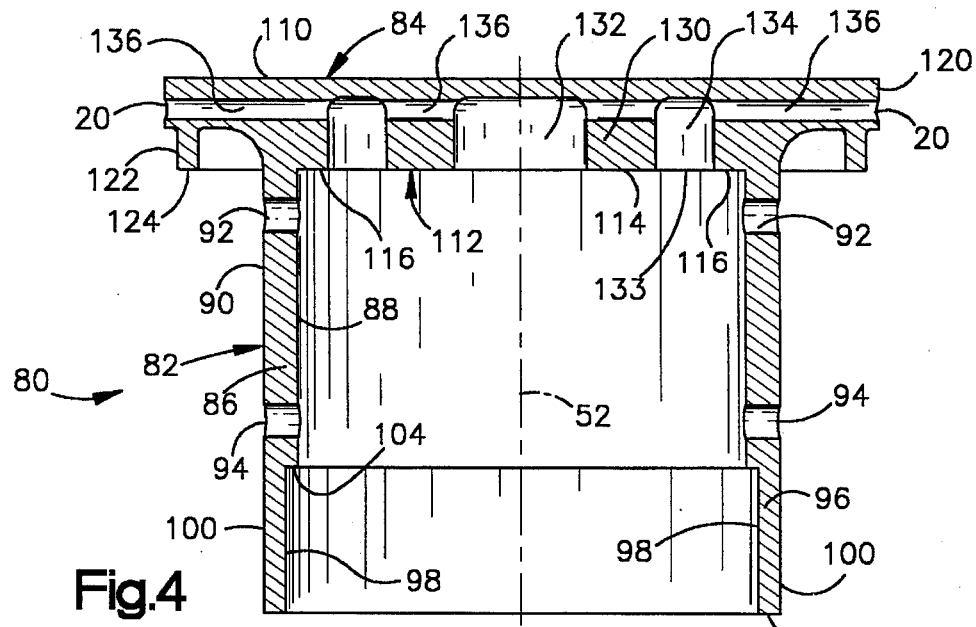
FIG. 4 is a sectional view of a center member included in the inflator of FIG. 1 and shown in an unwelded condition prior to assembly in the inflator.

The housing 40 also includes a center member 80 (FIGS. 2 and 4). The center member 80 is shown in FIG. 2 in a welded condition assembled in the inflator 10, and in FIG. 4 in an unwelded condition prior to assembly in the inflator. The center member 80 includes an axially extending cylindrical side wall 82 and a radially extending upper wall 84 formed as one piece with the side wall. The side wall 82 has a central portion 86 (FIG. 4) with cylindrical inner and outer surfaces 88 and 90 which extend parallel to the axis 52. Two circular arrays of gas flow openings 92 and 94 are formed in the side wall 82.

A lower end portion 96 of the side wall 82 of the center member 80 has cylindrical inner and outer surfaces 98 and 100 which extend parallel to the axis 52. The outer surface 100 of the lower end portion 96 of the side wall 82 has the same diameter as the outer surface 90 of the central portion 86 of the side wall. The inner surface 98 of the lower end portion 96 of the side wall 82 has a larger diameter than the inner surface 88 of the central portion 86 of the side wall, so that a radially extending shoulder 104 is formed between the surfaces 98 and 88. When the center member 80 is in the unwelded condition shown in FIG. 4, the lower end portion 96 has an annular radially extending lower end surface 102.

The upper wall 84 (FIG. 4) of the center member 80 has a planar outer side surface 110 which is circular in configuration. A planar inner side surface 112 of the upper wall 84 extends parallel to the outer surface 110 and includes two ring-shaped portions 114 and 116 centered on the axis 52. The ring-shaped portion 116 is larger in diameter than the ring-shaped portion 114. The upper wall 84 has a cylindrical outer side surface 120 in which the gas outlet openings 20 are formed. An annular flange portion 122 of the upper wall 84 projects axially from the upper wall in a direction away from the outer side surface 110 of the upper wall. The flange portion 122 has an annular radially extending inner end surface 124 (FIG. 4) when the center member 80 is in the unwelded condition shown in FIG. 4.

The ring-shaped surface portion 114 on the upper wall 84 is formed on a cylindrical axially extending inner wall portion 130 of the upper wall 84. The inner wall portion 130 extends around a cylindrical central cavity 132 in the upper wall 84. An annular outlet opening 133 is formed in the inner surface 112 of the upper wall 84, at a location radially intermediate the surface portions 114 and 116. The outlet opening 133 communicates with an annular distribution chamber 134 disposed radially outward of the wall portion 130.

A circular array of gas outlet passages 136 is formed in the upper wall 84 of the center member 80. Each gas outlet passage 136 extends radially between the central cavity 132 and the outer side surface 120 of the center member 80. The gas outlet passages 136 extend through the distribution chamber 134 and terminate in the gas outlet openings 20 (FIGS. 1–4) of the inflator 10.

A circular sheet metal rupture disk 140 (FIG. 2) is welded to the inner side surface 112 of the upper wall 84 of the center member 80. A central dome-shaped portion 142 of the rupture disk 140 projects axially into the central cavity 132 of the center member 80. The central portion 142 of the rupture disk 140 is provided to relieve pressure in the inflator 10 in the event of over-pressurization such as might occur in a fire. A ring-shaped portion 144 of the rupture disk 140 located radially outward of the central portion 142 extends across and closes the outlet opening 133 to the distribution chamber 134. A radially outermost portion 146 of the rupture disk 140 is welded to the surface portion 116 of the upper wall 84 of the center member 80.

Figure 5:
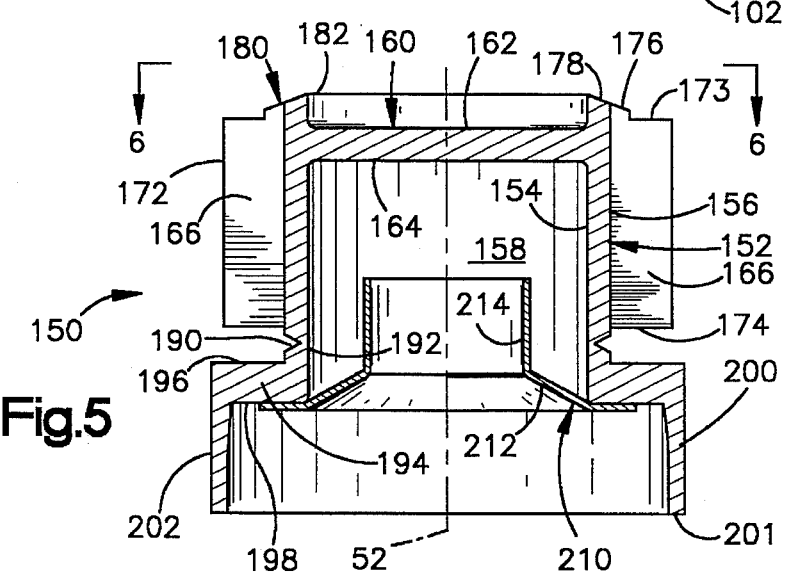
FIG. 5 is a sectional view of a piston included in the inflator of FIG. 2 and shown in an unwelded condition prior to assembly in the inflator.
Figure 6:
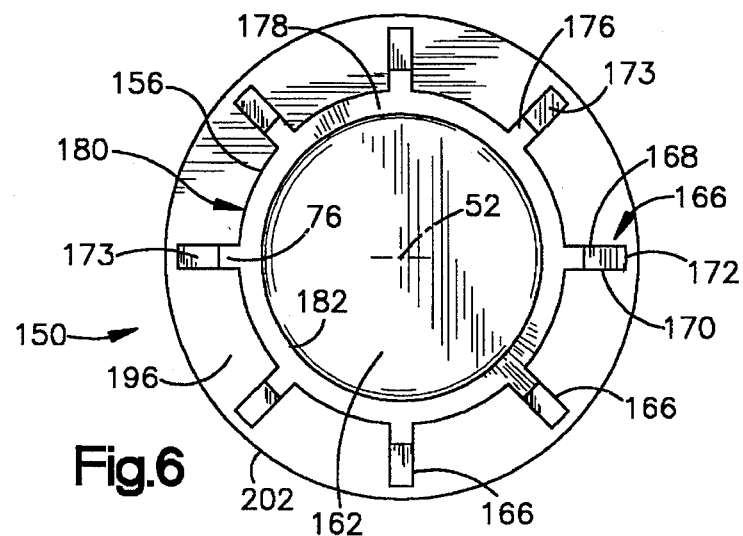
FIG. 6 is a plan view taken along line 6—6 of FIG. 5.

The inflator 10 includes a piston 150 (FIGS. 2, 5 and 6). The piston 150 is shown in FIG. 2 in a welded condition assembled in the inflator 10, and in FIG. 5 in an unwelded condition prior to assembly in the inflator. The piston 150 is a one-piece forging having a cylindrical side wall 152 with parallel axially extending inner and outer surfaces 154 and 156. The inner surface 154 of the piston 150 partially defines a combustion chamber 158 inside the piston. The combustion chamber 158 is capped by a radially extending end wall 160 of the piston 150 which is formed as one piece with the side wall 152. The end wall 160 has parallel radially extending upper and lower side surfaces 162 and 164.

A plurality of fins 166 (FIGS. 5 and 6) extend radially outward from the side wall 152 of the piston 150. The fins 166 are spaced equally in a circular array about the axis 52. Each fin 166 has planar, axially extending opposite side surfaces 168 and 170 and a radially outer edge surface 172. Each fin 166 has an upper end surface 173 and a lower end surface 174. The side wall 152 of the piston 150 extends axially past the end surfaces 173 of the fins 166 and past the end wall 160 of the piston in a direction toward the upper wall 84 of the center member 80. A sloping end surface portion 176 of each respective fin 166 merges with a sloping upper end surface 178 of the piston side wall 152 to form a frustoconical cutting surface 180 on the piston 150. The cutting surface 180 has a circular configuration centered on the axis 52. The cutting surface 180 terminates radially inwardly at a circular cutting edge 182 which is machined on the piston 150.

A stress riser in the form of an annular groove 190 is formed in a lower end portion 192 of the side wall 152 of the piston 150. The groove 190 has a V-shaped configuration and is formed on the outer surface 156 of the side wall 152 of the piston 150. A mounting portion 194 of the piston 150 extends radially outward from the lower end portion 192 of the side wall 152 at a location below (as viewed in FIG. 5) the stress riser 190. The mounting portion 194 has parallel upper and lower side surfaces 196 and 198. A cylindrical flange portion 200 of the piston 150 extends axially from the lower side surface 198 of the mounting portion 194. The flange portion 200 has an annular radially extending end surface 201 when the piston 150 is in the unwelded condition shown in FIG. 5. A cylindrical outer side surface 202 of the piston 150 extends axially over the mounting portion 194 and the flange portion 200.

A sheet metal baffle 210 (FIGS. 2 and 5) is spot welded to the lower side surface 198 of the mounting portion 194 of the piston 150. The baffle 210 includes a frustoconical portion 212 and a cylindrical portion 214 which extends axially from the frustoconical portion 212 toward the end wall 160 of the piston 150.

A tubular body of ignitable material 220 (FIG. 2) is secured in a known manner (not shown) to the cylindrical inner surface 154 of the side wall 152 of the piston 150. The body of ignitable material 220 is disposed in the combustion chamber 158. A suitable material for the body of ignitable material 220 has the following composition:

| % By Weight | Ingredient |
| --- | --- |
| 73% | Potassium perchlorate |
| 8.7% | Dioctyl adipate |
| 6.6% | Polyvinyl chloride |
| 0.05% | Carbon Black |
| 0.15% | Stabilizers (Boron, Chromium) |
| 11.5% | Potassium nitrate |

Alternatively, the body of ignitable material 220 could have any other suitable composition known in the art.

A support ring 230 is disposed on the piston 150 between the lower end surfaces 174 of the fins 166 and the upper side surface 196 of the mounting portion 194. The support ring 230 extends around the side wall 152 of the piston 150 at a location radially outward of the stress riser 190 in the piston. The support ring 230 has a split-ring configuration to enable assembly of the support ring onto the piston 150. The support ring 230 is disposed in a load-bearing relationship between the fins 166 and the mounting portion 194 of the piston 150 to assume at least a portion of any axial compressive load on the piston side wall 152 to prevent unintended failure of the piston at the stress riser 190.

The inflator 10 further includes a known initiator 240 having a mounting flange 242 welded to the mounting portion 68 of the lower wall 62 of the shell 50. The initiator 240 has a cylindrical body portion 244 which projects axially inside the cylindrical portion 214 of the baffle 210. The body portion 244 of the initiator 240 is disposed within the combustion chamber 158 in the piston 150 at a location radially inward of the body of ignitable material 220. The lead wires 38 (FIG. 1) are electrically connected with the initiator 240 in a known manner (not shown).

The housing 40 of the inflator 10 defines a gas storage chamber 250 for storing gas under pressure for inflating the air bag 16. A ring-shaped portion 252 of the gas storage chamber 250 is disposed radially outward of the side wall 82 of the center member 80. Another portion 254 of the storage chamber 50 is disposed radially inward of the side wall 82 of the center member 80. The gas storage chamber portion 254 includes the spaces between adjacent pairs of fins 166 on the piston 150, as well as the space between the rupture disk 140 and the end wall 160 of the piston 150.

The housing 40 of the inflator 10 is assembled in a manner described below by friction welding the shell 50, the center member 80 and the piston 150. Prior to the friction welding process, the flange portion 122 (FIG. 4) of the upper wall 84 of the center member 80 has a greater axial extent than when the parts are in the welded condition illustrated in FIG. 2. The lower end portion 96 of the side wall 82 of the center member 80 has a greater axial extent when in the unwelded condition illustrated in FIG. 4 than when in the welded condition illustrated in FIG. 2. Also, the flange portion 200 of the piston 150 has a greater axial extent when in the unwelded condition illustrated in FIG. 5 than when in the welded condition illustrated in FIG. 2.

To assemble the inflator 10, the rupture disk 140 (FIG. 2) is welded to the center member 80. The support ring 230 is assembled with the piston 150. The body of ignitable material 220 and the baffle 210 are secured to the piston 150.

The piston 150 is press fitted into the center member 80 so that the cylindrical outer side surface 202 of the piston is in abutting engagement with the cylindrical inner surface 98 of the lower end portion 96 of the center member 80. The upper side surface 196 of the mounting portion 194 of the piston 150 engages the radially extending shoulder 104 on the center member 80. The mounting portion 194 of the piston 150 is preferably spot welded to the lower end portion 96 of the center member 80, in a manner not shown, to secure the piston for movement with the center member during the subsequent friction welding process.

The assembly of the piston 150 and the center member 80 is then moved axially downward (as viewed in FIG. 2) through the upper opening 60 of the shell 50. The piston 150 and the center member 80 are rotated about the axis 52 at a high speed. The flange portion 122 of the wall 84 of the center member 80 engages the outer side surface 56 of the upper wall 54 of the shell 50. As the upper wall 84 of the center member 80 engages the shell 50, the material of the flange portion 122 spreads radially to form a friction weld with the upper wall 54 of the shell 50.

At the same time, the lower end portion 96 of the center member 80, and the flange portion 200 of the piston 150, engage the inner side surface 64 of the lower wall 62 of the shell 50. The material of the lower end portion 122 of the center member 80 and the material of the flange portion 200 of the piston 150 spread radially to form a friction weld with the lower wall 62 of the shell 50.

The initiator 240 is welded to the lower wall 62 of the shell 50. The gas storage chamber 250 is filled through a fill port (not shown) with a known inflation fluid such as argon or nitrogen under pressure.

When the inflator 10 is assembled into the air bag module 12 (FIG. 1), the electrical circuit 30 extends through the initiator 240 via the lead wires 38. When the vehicle experiences a collision, the switch 34 closes and an electric current is passed through the initiator 240. The initiator 240 is actuated and produces combustion products which ignite the body of gas generating material 220 within the combustion chamber 158. The ignitable material 220, as it burns in the combustion chamber 158, produces further combustion products including heat and gas. As a result, the pressure within the combustion chamber 158 increases rapidly to an elevated level.

Figure 3:
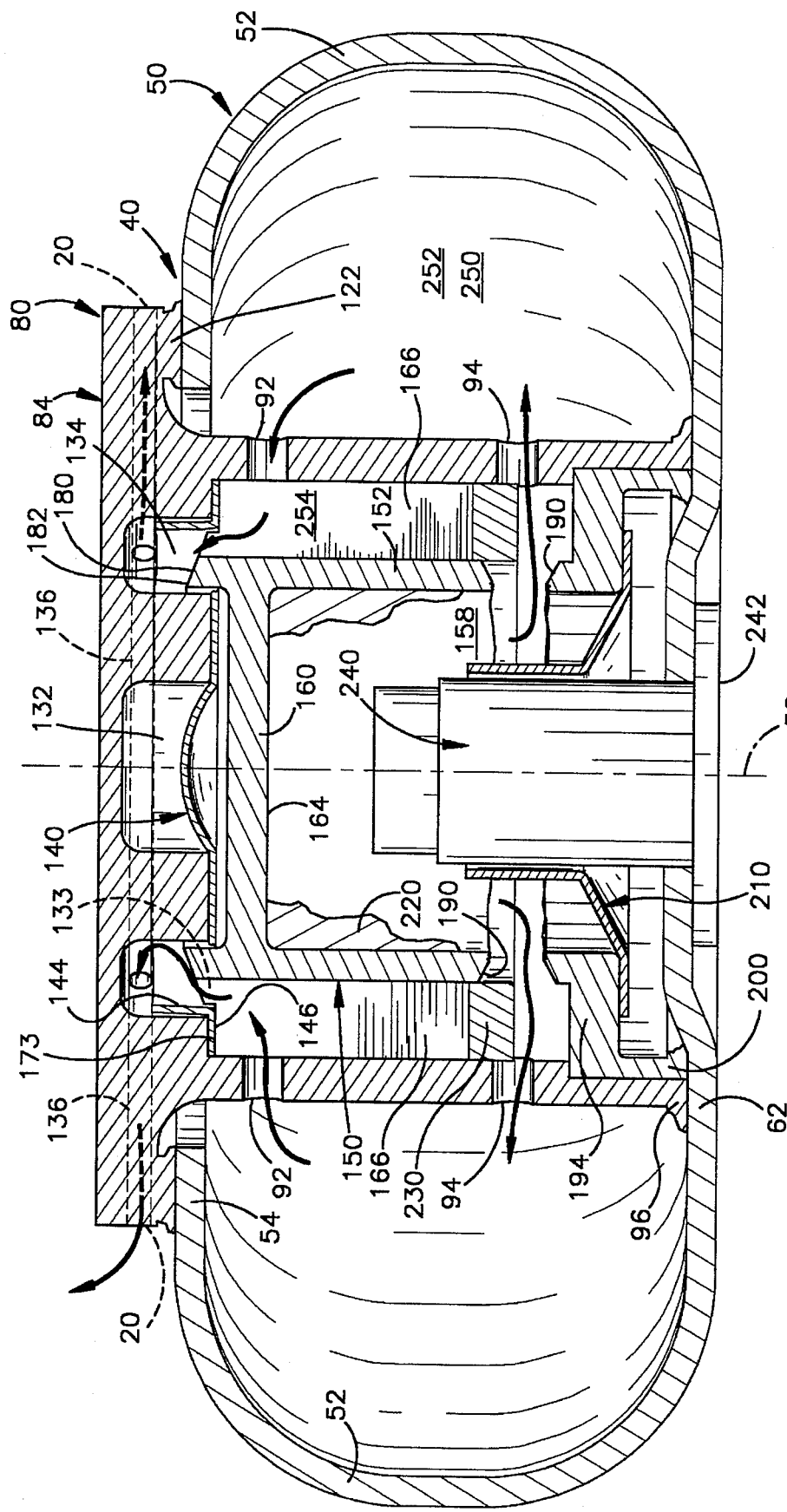
FIG. 3 is a view similar to FIG. 2 showing the inflator of FIG. 1 in an actuated condition.

The increasing pressure pressure within the combustion chamber 158 acts forcefully in an upward direction as viewed in FIGS. 2 and 3 against the lower side surface 164 of the end wall 160 of the piston 150. The force of the increasing pressure in the combustion chamber 158 ruptures the stress riser 190 of the piston 150 when the force reaches a predetermined elevated level. A severed portion of the piston 150 is thus released, as shown in FIG. 3, for movement axially upward under the influence of the force of the pressure within the combustion chamber 158. The severed portion of the piston 150 is propelled axially from the position shown in FIG. 2 to the position shown in FIG. 3. The upward movement of the piston 150 ceases when the upper end surfaces 173 of the fins 166 engage the portion 146 of the rupture disk 140 on the upper wall 84 of the center member 80.

During the movement of the piston 150 from the unactuated position shown in FIG. 2 to the actuated position shown in FIG. 3, the circular cutting edge 182 on the piston engages the ring-shaped portion 144 of the rupture disk 140 covering the outlet opening 133 into the distribution chamber 134. The cutting edge 182 shears a circular opening in the ring-shaped portion 144 of the rupture disk 140. This shearing action occurs prior to the engagement of the fins 166 on the piston 150 with the portion 146 of the rupture disk 140. Thus, the piston 150 continues moving upward toward the top wall 84 of the center member 80 after the circular opening is cut in the rupture disk 140. The frusto-conical cutting surface 180 on the piston 150 forces the material of the rupture disk 140 axially upward and radially outward toward an open position shown in FIG. 3. This shearing effect of the cutting action of the piston 150 results in a positive, immediate opening of the rupture disk 140. The distribution chamber 134 in the upper wall 184 of the center member 80 is thus placed in fluid communication with the inner portion 254 of the gas storage chamber 250.

The movement of the piston 150 to the actuated position shown in FIG. 3 uncovers the radially inner ends of the lower gas flow openings 94 in the center member 80. Thus, the combustion chamber 158 in the piston 150 is placed is fluid communication with the ring-shaped portion 252 of the gas storage chamber 250. The pressurized combustion products within the combustion chamber 158 are released and are directed by the baffle 210 to flow radially outward through the openings 94 and into the radially outer portion 252 of the gas storage chamber 250. The heat and pressure of those combustion products then increase the temperature, pressure, and volume of the gas in the gas storage chamber 250. A large volume of gas is rapidly directed from the gas storage chamber 250 through the upper gas flow openings 92. The gas flows through the outlet opening 133 and the distribution chamber 134 and into the gas outlet passages 136. The gas flows from the gas outlet passages 136 through the gas outlet openings 20 into the air bag 16 to inflate the air bag.

Figure 7:
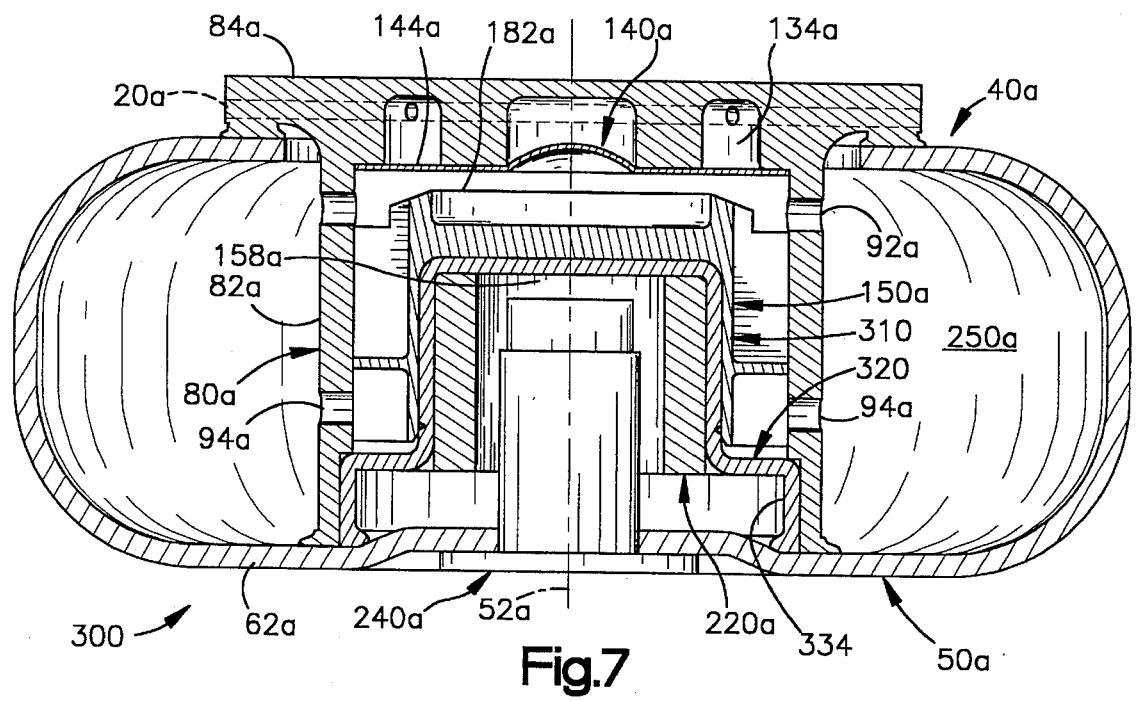
FIG. 7 is a schematic sectional view similar to FIG. 2 of an air bag inflator constructed in accordance with a second embodiment of the present invention and including a two part piston assembly.
Figure 8:
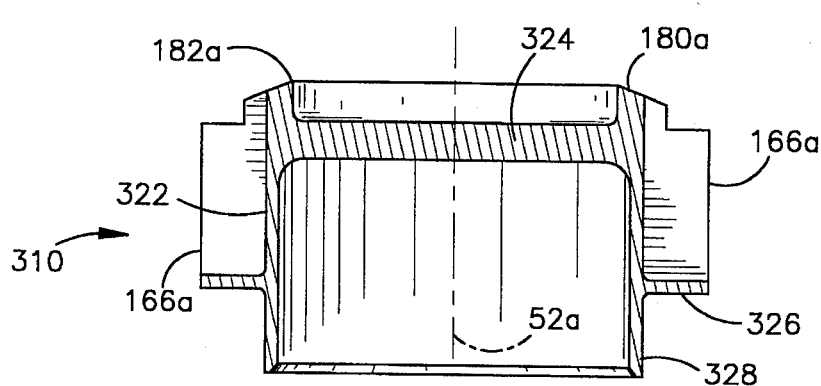
FIG. 8 is a sectional view of the first part of the piston assembly included in the inflator of FIG. 7.
Figure 9:
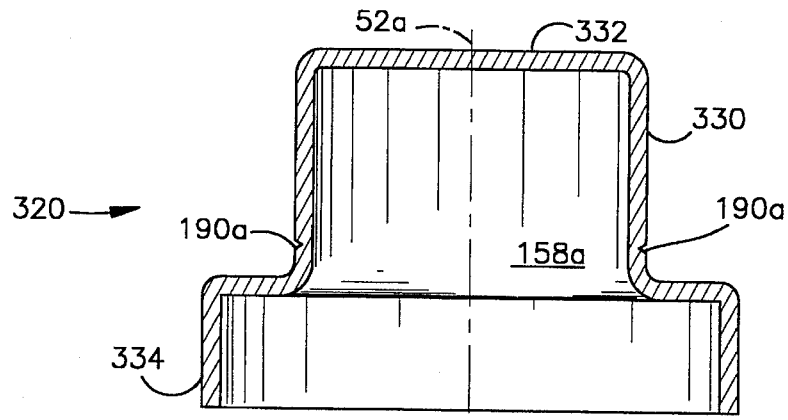
FIG. 9 is a sectional view of the second part of the piston assembly included in the inflator of FIG. 7.

FIGS. 7–9 illustrate an air bag inflator 300 which is constructed in accordance with a second embodiment of the present invention. The inflator 300 is generally similar to the inflator 10 (FIGS. 1–6) and similar parts are given the same reference numeral with the suffix "a".

The inflator 300 (FIG. 8) includes a two-part piston 150a rather than the one-part piston 150 (FIGS. 1–6). The piston 150a includes a cast outer piston member 310 (FIG. 8) and a stamped inner piston member 320 (FIG. 9) connected for movement with each other by spot welding in a manner not shown. This type of construction can be less expensive to manufacture than the one-piece forging of the piston 150 of the inflator 10.

The outer piston member 310 (FIG. 8) includes a cylindrical axially extending side wall 322 which is formed as one piece with a radially extending end wall 324. A plurality of fins 166a extend radially outward from the side wall 322. The fins 166a terminate at a radially extending intermediate wall 326 which is disposed above (as viewed in FIG. 8) a lower end portion 328 of the side wall 322.

The inner piston member 320 (FIG. 9) includes a cylindrical axially extending side wall 330 which is formed as one piece with a radially extending end wall 332. A stress riser 190a in the form of a V-shaped groove is formed on the side wall 330 above a cup-shaped mounting portion 334 of the inner piston member 320. The mounting portion 334 is press fitted and spot welded in the side wall 322 of the outer piston member 310. When the housing 40a of the inflator 300a is assembled, the mounting portion 334 of the inner piston member 320 is friction welded to a lower wall 62a of a shell 50a and to a lower end portion of a side wall 82a of a center member 80a.

When the inflator 300a is assembled and filled with gas under pressure, the annular space which extends axially between the intermediate wall 326 of the outer piston member 310 and the mounting portion 334 of the inner piston member 320 is pressurized through the lower gas flow openings 94a. Therefore, no support ring such as the support ring 230 is needed. The inflator 300a, when assembled and filled, functions in the same manner as the inflator 10.

From the above description of the invention, those skilled in the art will perceive improvements, changes and modifications in the invention. Such improvements, changes and modifications within the skill of the art are intended to be covered by the appended claims.

Having described the invention, I claim:

1. An apparatus for inflating an inflatable vehicle occupant restraint, said apparatus comprising:

a housing comprising a center member and a shell member defining a stored gas chamber containing gas for inflating the inflatable vehicle occupant restraint, means for defining an outlet opening through which gas can flow from said stored gas chamber, and a closure member on said housing for closing said outlet opening;

a piston movable in said housing for opening said closure member; and an igniter connected with said housing for, upon actuation, moving said piston to open said closure member;

said center member of said housing including a cylindrical side wall extending around an axis of said apparatus, said cylindrical side wall having first and second axial end portions;

said center member of said housing including an end wall that includes said means for defining an outlet opening and having a flange portion extending radially outward from said cylindrical side wall;

said shell member of said housing including an annular side wall which encircles said cylindrical side wall of said center member, said annular side wall of said shell member having a first wall portion welded to said flange portion of said center member at an annular first weld location, said annular side wall having a second wall portion welded to said second end portion of said center member at an annular second weld location spaced axially from said first weld location;

said piston having a first axial end portion with a cutting edge for opening said closure member and a second axial end portion welded at said second weld location to said shell member and to said center member.

2. An apparatus as set forth in claim 1 wherein said second axial end portion of said piston has a stress riser and is rupturable at said stress riser in response to actuation of said igniter, said piston moving from an unactuated position to an actuated position upon rupturing of said stress riser to move said cutting edge into engagement with said closure member to shear said closure member.

3. An apparatus as set forth in claim 1 wherein said first weld location comprises a friction weld interconnecting said flange portion of said center member and said first wall portion of said annular side wall of said shell member, said second weld location comprising a friction weld interconnecting said second wall portion of said annular side wall of said shell member and said second end portion of said center member and said second axial end portion of said piston.

4. An apparatus as set forth in claim 1 wherein said second axial end portion of said piston includes a first cylindrical wall portion which is coaxial with said side wall of said center member and which has a press fit with said side wall of said center member.

5. An apparatus as set forth in claim 4 wherein said piston includes an annular wall extending radially inward from said second end portion of said piston and an second cylindrical wall portion extending axially from said radially extending wall, said second cylindrical wall portion including said cutting edge.

6. An apparatus as set forth in claim 1 wherein said piston and said igniter are disposed radially inward of said cylindrical side wall of said center member, said flange portion of said end wall being disposed axially adjacent to said first wall portion of said annular side wall of said shell member.

7. An apparatus as set forth in claim 1 wherein said annular side wall of said shell member defines a circular passage through which said center member and said piston are movable to weld together said piston and said center member and said shell member.

8. An apparatus as set forth in claim 1 wherein said piston has a circular cutting edge movable into engagement with said closure member upon actuation of said igniter for opening said closure member to enable flow of gas from said stored gas chamber through said outlet opening.

9. An apparatus as set forth in claim 8 wherein said piston includes a cylindrical side wall including a first axial end portion having a frustoconical cross-sectional configuration, said circular cutting edge comprising a radially inner terminus of said frustoconical configuration, said circular cutting edge being engageable with a ring-shaped portion of said closure member to cut said ring-shaped portion of said closure member.

10. An apparatus for inflating an inflatable vehicle occupant restraint, said apparatus comprising:

a housing including a shell and a center member defining a stored gas chamber containing gas for inflating the inflatable restraint, said housing including walls which encircle an axis and which define a ring shaped portion of said stored gas chamber centered on said axis;

said housing including means for defining an outlet opening through which gas can flow from said stored gas chamber;

a shearable closure member on said housing for closing said outlet opening;

an igniter connected with said housing radially inward of said ring shaped portion of said stored gas chamber;

an annular piston encircling said igniter and disposed radially inward of said walls which define said ring shaped portion of said stored gas chamber, said piston defining an ignitable material chamber which is located radially inward of said stored gas chamber and within which said igniter is disposed;

an ignitable material in said ignitable material chamber for, upon actuation, producing combustion products including heat for heating and pressurizing said stored gas in said stored gas chamber; and a circular cutting edge on said piston for shearing and penetrating said closure member to enable flow of gas from said stored gas chamber through said outlet opening;

said housing comprising a center member and a shell member;

said center member of said housing including a cylindrical side wall extending around said axis and having first and second axial end portions, said center member including an end wall which includes said means for defining an outlet opening and which has a flange portion extending radially outward from said cylindrical side wall;

said shell member of said housing including an annular side wall which encircles said cylindrical side wall of said center member, said annular side wall of said shell member having a first wall portion welded to said flange portion of said center member at an annular first weld location, said annular side wall having a second wall portion welded to said second end portion of said center member at an annular second weld location spaced axially from said first weld location;

said piston having a first axial end portion including said cutting edge and a second axial end portion welded at said second weld location to said shell member and to said center member.

11. An apparatus as set forth in claim 10 wherein said first weld location comprises a friction weld interconnecting said flange portion of said center member and said first wall portion of said annular side wall of said shell member, said second location comprising a friction weld interconnecting said second wall portion of said annular side wall of said shell member and said second end portion of said center member and said second axial end portion of said piston.

\* \* \* \* \*